March 31, 1970

L. C. HARVEY

Re. 26,840

TEMPERATURE ACTUATED VALVES

Original Filed Sept. 20, 1965

INVENTOR.
Leon C. Harvey
BY
Austin A. Webb
ATTORNEY

United States Patent Office

Re. 26,840
Reissued Mar. 31, 1970

26,840

TEMPERATURE ACTUATED VALVES

Leon C. Harvey, Cadillac, Mich., assignor to Kysor Industrial Corporation, Cadillac, Mich.

Original No. 3,313,485, dated Apr. 11, 1967, Ser. No. 488,361, Sept. 20, 1965. Application for reissue Apr. 9, 1969, Ser. No. 822,072
Int. Cl. G05d *23/275*
U.S. Cl. 236—86 17 Claims

Matter enclosed in heavy brackets [ ] appears in the original patent but forms no part of this reissue specification; matter printed in italics indicates the additions made by reissue.

*ABSTRACT OF THE DISCLOSURE*

*A temperature responsive valve employing a thermally responsive push pin and a spherical valve cooperative to open the valve between a supply means and a delivery means or between the delivery means and exhaust.*

This invention relates to improvements in temperature actuated valves.

The principal objects of this invention are:

First, to provide a valve structure which can be very economically produced to function at accurately predeterminable temperatures without maintaining high degrees of accuracy in the formation of the parts.

Second, to provide a temperature actuated valve in which the body and coupling elements may be inexpensively formed as screw machine parts, using extruded materials and standard bar stock.

Third, to provide a temperature actuated valve which will operate quickly at a predetermined temperature to first cut off a supply pressure from a using passage and subsequently open the using passage to the atmosphere, whether the supply pressure is subnormal or supernormal, and in which the flow of air through the valve and to the using passage will be filtered to exclude dust from the valve parts.

Other objects and advantages of the invention will be apparent from a consideration of the following description and claims.

The drawings, of which there is one sheet, illustrate a highly practical form of the valve assembly and one modified form thereof.

Figures 1, 2, 3:
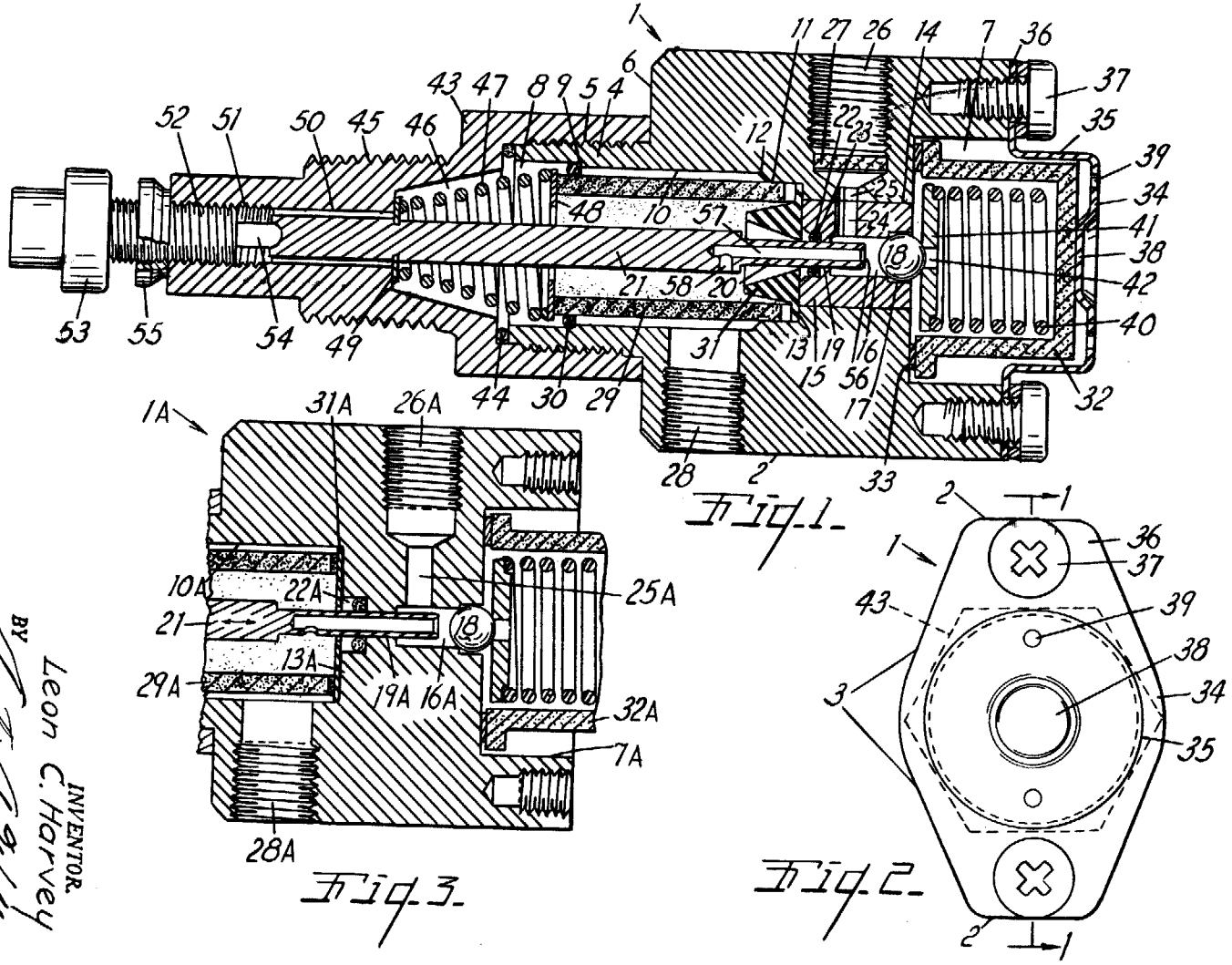
FIG. 1 is a longitudinal cross-sectional view through a preferred form of the valve assembly taken along the plane of the line 1—1 in FIG. 2.
FIG. 2 is an outer end elevational view of the valve assembly shown in FIG. 1.
FIG. 3 is a fragmentary longitudinal cross sectional view through a modified form of the valve illustrating changes made in the valve body shown in FIG. 1.

It is old to provide temperature response valves, particularly for controlling the opening and closing motions of shutters for the radiators of automobiles and trucks, in response to variations in temperature in the cooling jacket of the engines of these vehicles. The shutters may be actuated by subnormal vacuum pressure or supernormal positive pressure and the valves function to disconnect the shutter operating mechanism from the source of pressure and vent the operating mechanism to the atmosphere or conversely connect the source of pressure to the operating mechanism.

The present valve performs these functions and for this purpose is provided with a body, generally indicated at 1, having relatively short, flat top and bottom walls 2 with convex side walls 3 forming a body that is thicker in the center than at its edges. This shape is for economy of material and the body is conveniently formed as a continuous extrusion of aluminum. At the inner or left end of the body, as shown in FIG. 1, the body is turned to provide a neck 4 with external threads 5 leaving an axially inwardly facing shoulder 6. At its outer end the body defines a central cylindrical recess 7 which projects part way into the body. The neck 4 and the inner portion of the body are axially bored in a first bore 8 which terminates in an axially inwardly facing shoulder 9 with a second smaller bore 10 extending further into the body to a third bore 11 which is connected to the bore 10 by a beveled shoulder 12. The bore 11 ends in a flat shoulder 13 and opens to a fourth bore 14 that extends to the inner end of the recess 7.

Removably fitted within the bore 14 is a cylindrical valve body 15. The valve body 15 has a central cylindrical valve chamber 16 formed therein from its outer end with an enlarged ball receiving recess 17 at the outer end of the valve chamber so that the juncture of the chamber and the recess forms an exhaust seat for the metallic spherical ball valve 18. Inwardly from the valve chamber 16 the valve body 15 forms a central guide opening 19 for the radially reduced tip 20 of a valve rod 21. An enlarged recess 22 at the inner end of the passage 19 receives a flexible O-ring seal 23 that seals between the exterior of the reduced end 20 of the valve rod and the valve body 15. A radially opening passage 24 in the valve body connects the valve chamber 16 with a passage 25 in the main body 1 opening from the inner end of a delivery passage 26 that is internally threaded and has a disc 27 of porous filtering material pressed into its inner end.

Formed in the opposite side of the body 1 and displaced axially inwardly from the delivery port 26 is an internally threaded supply passage 28 which opens to the second bore 10 in the body. Centered in the bore 10 and spaced from the walls thereof is a cylindrical filter 29 of porous ceramic material, the cylinder 29 is centered in the bore by an annular deformable seal 30 seated against the shoulder 9 and by a double tapered guide element 31 of plastic material which seats against the shoulder 13 and the inner end of the valve body 15. The cylinder 29 is guided in assembly by the inwardly converging outer taper of the guide 30 and the reduced inner end of the valve rod is guided during assembly by the inwardly diverging inner taper of the guide 31.

At the outer or right end of the body the recess 7 is provided with an inwardly facing cylindrical cup-like filter 32 of porous ceramic material having a flange on its inner end sealed against a gasket 33 seated on the inner wall of the recess. The cup-shaped filter 32 is retained in place by a sheet metal end cap 34 having a cylindrical portion 35 embracing the sides of the filter in spaced relation and a peripheral flange 36 that is secured to the outer end of the main body by screws 37. The bottom or outer end of the end cap has an inwardly embossed center projection 38 that presses the cup-shaped filter into position and is also provided with vent holes 39 venting the recess 7 to the atmosphere. Positioned within the cup-shaped filter 32 is a coil spring 40 which bears between the bottom of the cup-shaped filter and a bearing plate 41 having a central hole 42 engaged with the surface of the ball valve 18 to locate the ball valve in the recess 17.

The valve assembly thus far described is mounted in the wall of a liquid chamber such as the cylinder block of an engine by means of a fitting 43 which is conveniently formed as a screw machine part of hexagonal metal material. The fitting 43 is internally threaded at its outer end to be threaded onto the threads 5 on the neck 4 and abutted against the shoulder 6. A deformable annular seal 44 seals the fitting to the main valve body so there is no loss of pressure along the threaded connection between the fitting and the body. Inwardly or to the left of the hexagonal portion of the fitting the fitting is provided with a tapered threaded neck 45 adapted to engage a suitable tapped hole in the cylinder block or coolant chamber. Internally the fitting has a tapered recess 46 which opens to the bore 8 in the valve body and receives a tapered coil spring 47 bearing between a first annular thrust ring 48 at the inner end of the filter cylinder 29 and a thrust ring 49 that is engaged in an annular groove in the valve rod 21 and seats against the inner end of the tapered recess 46 to limit inward motion of the valve rod. The spring 47 thus seats the filter cylinder 29 against the centering guide 31 and biases the valve rod inwardly.

The threaded neck 45 of the fitting defines a valve rod passage 50 that is interally threaded at 51 at its inner end to receive the threaded stem 52 of a thermally responsive actuating element or button 53. The button 53 is a well known commercially available item containing a thermally expandable semi-solid which functions to extend a push pin 54 from the element when the temperature of the button is increased. The push pin 54 engages the inner end of the valve rod 21 and pushes the valve rod outwardly against the compression of spring 47 when the temperature of the button 53 is increased. An annular lock nut 55 positioned on the threaded stem 52 locks the thermally responsive element and its push pin 54 in the desired calibrated position by clamping against the inner end of the fitting 43.

The reduced outer end 21 of the valve rod has a valve seat 56 formed in its outer end communicating with the axial passage 57 which extends partially through the valve rod to a radial passage 58 positioned within the filter cylinder 29. With the valve assembly in the position illustrated which corresponds to a cold condition of the thermally sensitive element 53 the supply passage 28 functions to deliver or create either subnormal or supernormal pressure in the bore 10 so that air passes through the filter cylinder 29, bore 58, bore 57 and open valve seat 56 to the valve chamber 16 from where the air flow is directed either inwardly or outwardly depending upon the pressure through the passages 24, 25 and 26 to the part to be controlled. Spring 40 and plate 41 hold the ball valve 18 closed against the seat at the outer end of the valve chamber.

As the temperature of the thermally responsive element 53 increases the push pin 54 projects outwardly moving the valve rod 21 and seat 56 toward the ball valve [56] *18* closing against the surface of the ball 18. The temperature at which this will occur is determined or calibrated by the adjusted position of the neck 52 in the threaded portion 51 of the mounting fitting. The valve assembly thus functions first to cut off the delivery of the controlled pressure from the supply passage 28 to the delivery passage 26. Almost immediately following the interruption of the supply connection the next increment of movement of the valve rod 21 unseats the valve 18 from its seat at the end of the valve chamber and the delivery passage 26 and valve chamber 16 are vented around the ball valve 18 to within the exhaust filter 32 and air passes through the latter filter and the vent ports 39 to the atmosphere to restore atmospheric pressure in the part being controlled. If the system is operating at supernormal pressure the air flows outwardly from the delivery passage 26 and through the exhaust filter 32 and ports 39; whereas, if the system is being operated at subnormal pressure or partial vacuum, air flows inwardly through the ports 39, filter 32 and passage 26 to the part being actuated.

Very little movement of the push pin 54 and the valve rod 21 in the critical area for which the valve is adjusted is sufficient to actuate the valve to either opened or closed position. When the ball 18 is closed it seats first in the end of the valve chamber 16 before the operating pressure is admitted to the valve chamber 16 and the part being operated so there is no opportunity for loss of operating pressure through the exhaust passages or ports 39.

FIGURE 3 illustrates a modified form of the valve assembly in which the valve body 1A is provided with the same outer recess 7A and exhaust filter 32A, and the same delivery passage 26A and supply passage 28A as in the first form of the valve. However, the bore 10A terminates in an inwardly facing shoulder 13A with a recess 22A in its outer end and the valve rod guide passage 19A and valve chamber 16A are formed directly in the body of the valve without the use of a separate inner valve body 15. The cylindrical filter 29A seats against a guide disc 31A that corresponds in function to the guide element 31 during assembly. The valve rod 21 and valve ball 18 are the same as in the first form of the valve and the valve assembly operates in the same manner as the first form of the valve. The inner port or passage 25A from the delivery passage 26A extends all of the way through the body to the valve chamber 16A.

The filter elements 29 and 32 may be of porous ceramic as stated, or they may be sintered metal porous bronze or aluminum. Any similar material having a porous nature and filtering capability plus sufficient rigidity to support the thrust force applied thereto may be used.

What is claimed as new is:

1. A valve for alternatively connecting a delivery passage from a part to be actuated to the atmosphere or to a supply passage in response to temperature change of a temperature responsive element having a push pin comprising, a main body having an inner filter recess and an outer filter recess formed in opposite ends thereof, means forming a valve chamber between said recesses with a valve rod passage extending from said chamber to said inner filter recess and with an opening formed by a first valve seat to said outer filter recess, a mounting fitting threadedly engaged with said body and defining an axial passage opening to said inner filter recess, said temperature responsive element being axially adjustably mounted on the inner end of said fitting with its pin extensible into said axial passage, a valve rod extending from said pin through said valve rod opening and having an axial bore in its outer end with a second valve seat formed therearound, a radial passage in said valve rod opening between the bore in the rod and said inner filter recess, a relatively rigid cylindrical filter positioned in said inner filter recess and around said valve rod in radially spaced relation to the rod and the inside of said inner filter recess, a first spring compressed between the inner end of said cylindrical filter and a thrust abutment engaged with said rod inwardly of the filter, said fitting having an internal shoulder limiting inward motion of said rod, a valve ball adapted to close on said first valve seat and opposed to said second valve seat, a second cup shaped filter of relatively rigid material positioned in inwardly facing relation in said outer recess, a cap removably secured to said body in retaining relation to said second filter and defining a vent opening open to the exterior of the second filter, an abutment plate engaged with said ball, a second spring compressed between said second filter and said abutment plate, first seal means engaged between said rod and said valve rod passage, and second seal means engaged between the exterior of said cylindrical filter and the interior of said inner recess axially inwardly of said supply passage, said main body and said chamber forming means having said delivery passage formed therethrough to said chamber, said main body having said supply passage formed therethrough to said inner recess.

2. A valve for alternatively connecting a delivery passage from a part to be actuated to the atmosphere or to a supply passage in response to temperature change of a temperature responsive element having a push pin comprising, a main body having a filter recess formed in its inner end, means forming a valve chamber between said recess and the outer end of said body with a valve rod passage extending from said chamber to said filter recess and with an opening formed by a first valve seat to said outer end of said body, a mounting fitting threadedly engaged with said body and defining an axial passage opening to said filter recess, said temperature responsive element being axially adjustably mounted on the inner end of said fitting with its pin extensible into said axial passage, a valve rod extending from said pin through said valve rod opening and having an axial bore in its outer end with a second valve seat formed therearound, a radial passage in said valve rod opening between the bore in the rod and said filter recess, a relatively rigid cylindrical filter positioned in said filter recess and around said valve rod in radially spaced relation to the rod and the inside of said filter recess, a first spring compressed between the inner end of said cylindrical filter and a thrust abutment engaged with said rod inwardly of the filter, a valve ball adapted to close on said first valve seat and opposed to said second valve seat, a second cup shaped filter of relatively rigid material positioned in inwardly facing relation at the outer end of said body, a cap removably secured to said body in retaining relation to said second filter and defining a vent opening open to the exterior of the second filter, an abutment plate engaged with said ball, a second spring compressed between said second filter and said abutment plate, first seal means engaged between said rod and said valve rod passage, and second seal means engaged between the exterior of said cylindrical filter and the interior of said recess axially inwardly of said supply passage, said main body and said chamber forming means having said delivery passage formed therethrough to said chamber, said main body having said supply passage formed therethrough to said recess.

3. A valve as defined in claim 2 in which said main body is an aluminum extrusion, and said means forming said valve chamber is a harder metal body pressed into an opening provided therefor between said recess and the outer end of said main body.

4. A valve as defined in claim 3 in which there is an annular assembly guide member at the outer end of said recess with an internal taper for guiding said rod and an outer taper for guiding the outer end of said cylindrical shield, both to radially spaced positions within said recess.

5. A valve as defined in claim 4 in which said first seal means is an annular deformable ring received in a recess formed in the inner face of said harder metal body.

6. A valve as defined in claim 2 in which said fitting abuts an inwardly facing shoulder on said main body, and in which said thrust abutment for said first spring engages an inward limit stop formed in the interior of said fitting.

7. A valve as defined in claim 6 in which there is a deformable annular seal engaged between abutting portions of said main body and said fitting.

8. A valve as defined in claim 2 in which said mounting fitting is formed of hexagonal bar stock with an internally threaded recess receiving an externally threaded neck on the inner end of said main body and in which the outer end of said fitting abuts said main body, and an annular deformable seal engaged between the inner end of said neck and the interior of said fitting.

9. A valve as defined in claim 3 in which said mounting fitting is formed of hexagonal bar stock with an internally threaded recess receiving an externally threaded neck on the inner end of said main body and in which the outer end of said fitting abuts said main body, and an annular deformable seal of said neck and the interior of said fitting.

10. A valve as defined in claim 2 in which there is a recess formed in the outer end of said body, and said second cup shaped filter is at least partially received in said outer recess.

11. A valve as defined in claim 2 in which said body is formed as an extrusion, and said means forming said valve chamber is an integral central portion of said body.

12. A valve as defined in claim 2 in which said main body has relatively narrow top and bottom surfaces in which said delivery passage and said supply passage are formed in axially offset relation, and said body has convex sides providing a thicker center in which said recess is formed.

13. A valve as defined in claim 12 in which said thicker center has an externally threaded neck formed on its inner end with which said mounting fitting is engaged.

14. A valve as defined in claim 13 in which said inlet passage and said supply passage are formed in opposite narrow sides of said body.

15. A temperature responsive valve comprising a main body having a recess formed in one end thereof with a [supply] connection opening transversely to said recess, means on said body closing the end of said recess and adapted to support the body from a chamber wall, a thermally responsive element carried by said body supporting means to project into the chamber and having a push pin extensible from the element axially of said body, means forming a valve chamber in said body at the outer end of said recess and communicating with said recess through a guide opening, said body defining a delivery opening and connection opening between said valve chamber and the exterior of said body, a first valve seat formed around an opening in the end of said chamber opposite said guide opening and communicating with the exterior of said body, a spherical valve positioned to seat on said first valve seat and project into said valve chamber, first spring means biasing said valve against said first seat, a valve rod having one end opposed to and engageable with said push pin and extending through said recess and said guide opening, means slidably sealing said rod in said guide opening, said rod having an axial passage formed therein from the end of the rod opposed to said valve to within said recess, an opening formed in said rod from said axial passage to said recess, a second seat formed around the end of said passage and engageable in passage closing relation with said inwardly projecting portion of said valve, and second spring means acting between said body and said rod to bias said rod toward said push pin.

16. A valve as defined in claim 15 in which said rod has means limiting its motion toward said push pin.

17. A valve as defined in claim 16 in which said thermally responsive element and the push pin thereof are adjustable axially relative to said body and said rod.

References Cited

The following references, cited by the Examiner, are of record in the patented file of this patent or the original patent.

UNITED STATES PATENTS

| | | | |
|---|---|---|---|
| 2,512,548 | 6/1950 | Kysor | 236—99 |
| 3,006,552 | 6/1961 | Ferris | 236—35.3 |
| 3,135,495 | 6/1964 | Ferris | 236—86 X |

EDWARD J. MICHAEL, Primary Examiner